United States Patent
Laster et al.

(10) Patent No.: US 10,200,823 B2
(45) Date of Patent: Feb. 5, 2019

(54) METHODS AND APPARATUS FOR CAPTURING DATA USING A MARINE ELECTRONICS DEVICE

(71) Applicant: Navico Holding AS, Egersund (NO)

(72) Inventors: Matthew Laster, Broken Arrow, OK (US); Christopher Richardson, Auckland (NZ)

(73) Assignee: NAVICO HOLDING AS, Egersund (NO)

(*) Notice: Subject to any disclaimer, the term of this patent is extended or adjusted under 35 U.S.C. 154(b) by 412 days.

(21) Appl. No.: 14/964,083

(22) Filed: Dec. 9, 2015

(65) Prior Publication Data

US 2017/0171316 A1    Jun. 15, 2017

(51) Int. Cl.
| | |
|---|---|
| G06F 15/16 | (2006.01) |
| H04W 4/04 | (2009.01) |
| B63B 49/00 | (2006.01) |
| G01C 21/20 | (2006.01) |
| G06F 3/0484 | (2013.01) |
| H04W 4/02 | (2018.01) |
| H04W 4/029 | (2018.01) |
| B63J 99/00 | (2009.01) |

(52) U.S. Cl.
CPC ............ *H04W 4/046* (2013.01); *B63B 49/00* (2013.01); *G01C 21/203* (2013.01); *G06F 3/0484* (2013.01); *H04W 4/027* (2013.01); *H04W 4/029* (2018.02); *B63J 2099/008* (2013.01)

(58) Field of Classification Search
USPC ........................................................ 709/217
See application file for complete search history.

(56) References Cited

U.S. PATENT DOCUMENTS

| | | |
|---|---|---|
| 8,982,768 B2 | 3/2015 | Mills et al. |
| 8,990,915 B2 | 3/2015 | Emmons et al. |

*Primary Examiner* — Hee Soo Kim
(74) *Attorney, Agent, or Firm* — Nelson Mullins Riley & Scarborough, LLP (57) ABSTRACT

Various implementations described herein are directed to technologies for capturing marine electronics data. An apparatus includes a processor and a memory having a plurality of executable instructions that are executed by the processor. The processor receives a first request to capture data. The processor generates a command in response to the first request. The processor sends the command across a network to one or more devices capable of responding to the command. The command may include at least timestamp data and a second request for each of the one or more devices to collect data that each of the one or more devices is configured to collect.

20 Claims, 6 Drawing Sheets

METHODS AND APPARATUS FOR CAPTURING DATA USING A MARINE ELECTRONICS DEVICE

BACKGROUND

The following descriptions and examples do not constitute an admission as prior art by virtue of their inclusion within this section.

Present day devices allow the setting of a waypoint on a chart panel of a marine electronics device. Setting a waypoint allows a user to mark a spot on a map so that the user may return to that spot later.

SUMMARY

Described herein are implementations of various technologies for capturing marine electronics data. An apparatus includes a processor and a memory having a plurality of executable instructions that are executed by the processor. The processor receives a first request to capture data. The processor generates a command in response to the first request. The processor sends the command across a network to one or more devices capable of responding to the command. The command may include at least timestamp data and a second request for each of the one or more devices to collect data that each of the one or more devices is configured to collect.

The apparatus may include a mark button for receiving the request. In one implementation, the first request may be initiated upon actuation of the mark button. In another implementation, the mark button provides a drop down menu and selection of an item in the drop down menu initiates the first request.

The first request may be initiated automatically. In one implementation, the first request is automatically initiated at a predetermined time. In another implementation, the first request is automatically initiated when certain data changes or when a threshold for certain data is reached.

The data may be collected periodically during a background operation. In one implementation, the collected data may be a static snapshot. In another implementation, the collected data may be a series of snapshots. The series of snapshots may be recorded for a trail of locations. The series of snapshots may be recorded over time.

The series of snapshots may be started either manually or automatically and stopped when a threshold has been reached. The threshold may be an event-based threshold and/or a time-based threshold.

In one implementation, data from the one or more devices is associated based on the timestamp data.

Also disclosed herein is a non-transitory computer-readable medium having stored thereon a plurality of computer-executable instructions which, when executed by a computer, cause the computer to: receive, at a marine electronics device, a first request to capture data; generate, by the marine electronics device, a command in response to receiving the first request; and send, by the marine electronics device, a command across a network to one or more devices capable of responding to the command, the command including at least a timestamp and a second request for each of the one or more devices to collect one or more snapshots of data.

Further disclosed herein is a non-transitory computer-readable medium having stored thereon a plurality of computer-executable instructions which, when executed by a computer, cause the computer to: receive, at the marine electronics device, a request to mark a waypoint; record, by the marine electronics device, position data and a screenshot of current sonar data; and associate, by the marine electronics device, the position data and the screenshot of the current sonar data with the marked waypoint.

In one implementation, an indicator of the screenshot may be provided on a chart screen of the marine electronics device. In another implementation, the screenshot may be provided in a waypoint data panel accessible by selecting a waypoint from a list of waypoints.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

The following paragraphs provide a brief summary of various technologies and techniques directed at a sonar system described herein.

Implementations disclosed herein provide increased functionality for the mark button on a marine electronics device. Many marine electronic devices include a button, which may be called the mark button. Typically, when a user presses that button, there is some associated functionality. Implementations disclosed herein enhance that functionality. Various techniques described herein enable the mark button to be applicable across various devices and equipment in communication with the marine electronics device.

Various implementations for capturing data using a marine electronics device will now be described in more detail with reference to FIGS. 1-6.

Figure 1:
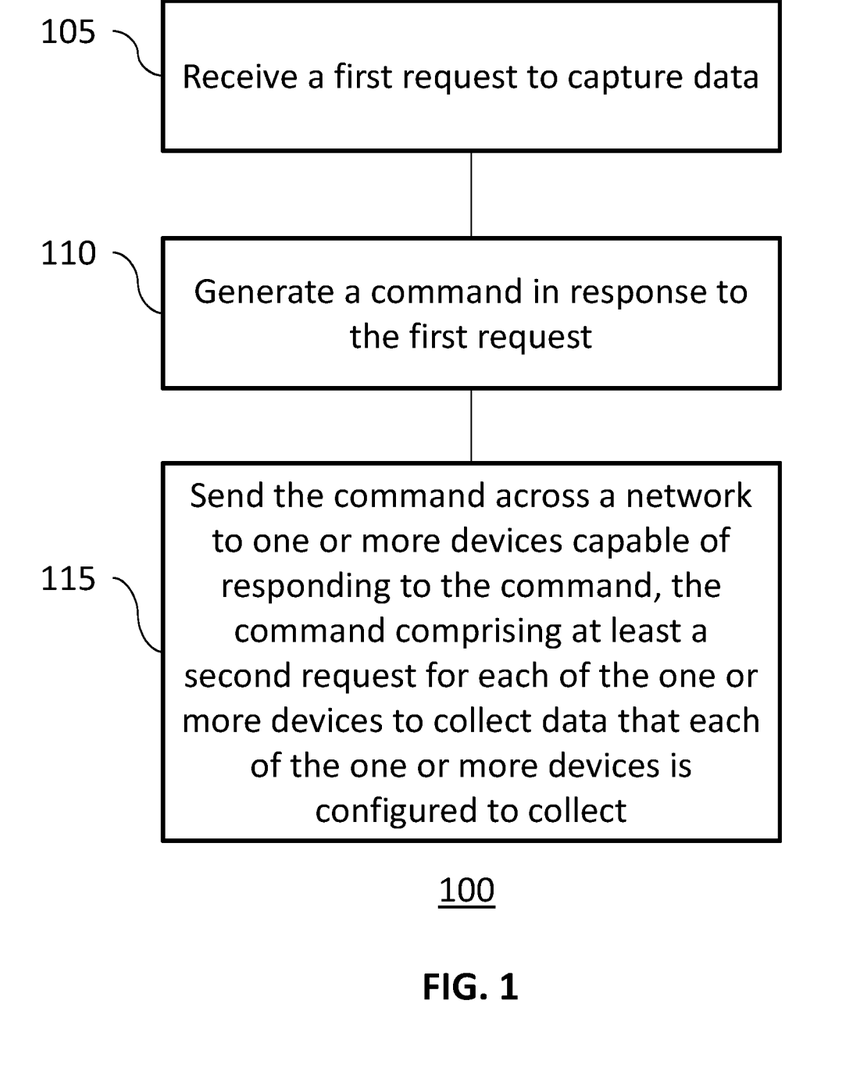
FIG. 1 illustrates a method for capturing data using a marine electronics device in accordance with various implementations described herein.

FIG. 1 illustrates a method 100 for capturing data using a marine electronics device in accordance with various implementations described herein. In one implementation, method 100 may be performed by a computing system. It should be understood that while method 100 indicates a particular order of execution of operations, in some implementations, certain portions of the operations might be executed in a different order. Further, in some implementations, additional operations or steps may be added to method 100. Likewise, some operations or steps may be omitted.

At block 105, a first request is received to capture data. At block 110, a command is generated in response to the first request. At block 115, the command is sent across a network to one or more devices capable of responding to the command. In one implementation, the device that receives the first request and generates and sends the command is coupled to the one or more devices capable of responding to the command via the National Marine Electronics Association (NMEA) protocol. The command comprises at least a second request for each of the one or more devices to collect one or more snapshots of data associated with the respective device, e.g., data that each of the one or more devices is configured to collect. In one implementation, the command further includes timestamp data and/or a unique identifier.

Conventional use of the mark button marks a waypoint on a chart function of the marine electronics device. Implementations as disclosed herein provide for using the mark button to take a snapshot of sonar data, radar data, Global Positioning System (GPS) location, radio transmission (TX) and/or receive (RX) status, boat speed, temperature, etc. Storage of that data may be in the device that received the first request, e.g., via the mark button, or in one or more other locations. In one implementation, the storage of that snapshot can be in each device that manages the snapshot. In one implementation, a time-stamped snapshot is recorded across one or more devices. Alternatively, the mark button may be pushed and a user may choose from a drop down menu to take a pre-configured snapshot, which may, for example, only be sonar, radar, weather, and/or chart data.

In one implementation, the user may start or stop logging of data (e.g., similar to the logging of data in a black box of an airplane). If a problem occurs, the user may push the mark button or the snapshot functionality may be initiated automatically based on pre-determined criteria. Once logging is initiated, all of the pertinent data, e.g., charts, speed, direction, etc., can be collected. In this manner, for example, if the user's vessel has run aground or into another boat, some data may be available, e.g., for insurance purposes.

In one implementation, data collected periodically in the background may be started or stopped based on user input or some other event. For example, for snapshotting of data, a periodic snapshot may occur every five seconds or some other time increment. The user may invoke, start, or stop the snapshotting of data. The snapshot may be on-demand and occur, for example, when a user pushes a button to collect the data. In one implementation, data may be collected on a system-wide basis, e.g., all devices receive the command to collect data. In another implementation, data may be collected from a smaller subset of devices. In this implementation, the smaller subset of devices receives the command to collect data. In either implementation, the data is related as described below using at least a timestamp. For example, an angler initiating a snapshot may, using the implementations disclosed herein, take a snapshot that provides location, temperature, depth, weather conditions, location of catch, location of anchor, tank level, flow level, boat status, imaging status, wind speed, etc. The data for these snapshots is collected by an associated device and/or module. Data collected periodically in the background may be part of a periodic polling feature that provides a background log of snapshots driven by event or time.

Generally, when marking a waypoint on a chart panel, the waypoint is typically denoted by a cross, a number or some other alphanumeric representation. When marking a waypoint, the position data, sonar data, radar, GPS, auto-pilot status, and auto menu may be recorded. In one implementation, this recorded data (snapshot) is not limited to static locations. The snapshot data may be recorded for a trail of locations. In another implementation, the snapshot data may be recorded as the beginning of a search grid.

In one implementation, instead of creating a static snapshot, a series of snapshots may be taken over time. Data may be recorded according to different time intervals, e.g., frames per minute, time stamps per minute. The series of snapshots can be started and then driven by the data. For example, the marine electronics device can receive an indication to send a command to the one or more devices to start taking snapshots when a boat is within 20-30 feet of water and continue recording those snapshots.

In one implementation, recording of a series of snapshots may be stopped using the mark button. For example, when the marine electronics device has been preconfigured send a command to the one or more devices to take system wide snapshots every minute when a user presses the mark button, system wide snapshots will continue to be taken until the user presses the mark button to stop taking system wide snapshots.

In one implementation, the decision to stop recording snapshots may be preconfigured to be time driven and/or data driven. In the case of data, the series of snapshots may be started/stopped when certain data is changed or a threshold for the data is reached. For example, a series of system snapshots can be taken when the vessel reaches a certain threshold speed and the system may automatically stop taking snapshots when the vessel begins traveling under the speed threshold. In the case of time, a series of snapshots can be started when a waypoint is marked and the system may be pre-configured to stop after a certain amount of time has lapsed.

In one implementation, the system data from various devices are associated based on time stamping. System data may include, but is not limited to sonar data, radar data, a photograph, and/or any other data, e.g., engine data and/or engine management data, on the network, e.g., MFD 2000, NMEA 2000 or similar network. The snapshot or series of snapshots is initiated by sending a command that any device on the network may be able to honor.

A snapshot or a recording, e.g., series of snapshots, of system data may be provided. In one implementation, a chart device, a sonar device, and a radar device are all separate but coupled by a network, e.g., an NMEA network. When the user presses a chart mark button on the chart device, the user is able to obtain a log of each of the screens from the other devices. In one implementation, all of the data from the other devices is not sent to the chart device. The data collected by each individual device is stored locally in the respective device. Upon receiving the command, the individual devices would take one or more local snapshots of the data they manage.

In one implementation, at least one timestamp is sent from the marine electronics device to the individual devices and these individual devices would become responsible for the data gathering for the particular process(es). So, using the above example, the sonar device would collect sonar data, the chart would collect chart data, and the radar device would collect radar data. The data collected by each device would be linked at least by a timestamp. The individual devices are responsible for processing the pertinent data.

The individual devices receive a command from the marine electronics device and the timestamp to associate with the data.

Additionally, the collected data may also be linked by a unique identifier to differentiate the system snapshot(s) from other data having the same timestamp. In this implementation, the marine electronics device sends a timestamp and a unique identifier. Data may be retrieved from any device in the system using a wireless or direct connection by searching through the timestamps and/or identifiers. For example, if four devices have the same timestamp, the unique identifier helps differentiate between system wide data and local data. The unique identifier may be used to look for data anywhere on the network.

In one implementation, there may be some devices that are not capable of responding to a request to take one or more snapshots. However, these particular devices may already be presenting data on the network. The data from these particular devices can be gathered and stored on at least one of the devices in the network.

Once the individual devices, e.g., modules, take a local snapshot of its own data, the data remains stored on that device (and/or in a storage location associated with the module). The marine electronics device or any other device on the network has the ability to retrieve the snapshot(s). The system-wide snapshot data can be requested from a menu/logging system. This data can be retrieved from the network over a wireless or wired connection. Some connection types include, but are not limited to, WIFI or other connection types. Any device with logging capability may allow the user to navigate to these system-wide events (snapshots) and retrieve them.

At the time the command from the marine electronics device is given, e.g., when the button is pushed, at a certain predetermined time, or when a certain data threshold is reached, the timestamp and request are sent to all units and they gather their snapshots and mark them, tag them, and store them each locally.

In one implementation, the local snapshot data can be stored in the device taking the snapshot. In another implementation, the local snapshot data can also be stored in a local hard drive or sent to a cloud based memory location. A user can access their account and store the data for themselves. In addition, the user can perform spreadsheet analysis or share the data with other users.

In one implementation, the marine electronics device can be placed in a teaching mode. In the teaching mode, a keystroke record mode may be invoked with the same mark button. Once keystroke record mode is invoked, the device enters a tutorial mode and records how the user used the marine electronics device and determines how easy or difficult the device was to use. In this implementation, instead of taking system wide snapshots, the device user interface takes one or more input snapshots. These input snapshots may be used to provide training to a user of the marine electronics device.

The data acquired according to the present disclosure may be used in record keeping, debugging, collision/fault determination. In addition, as described above, this acquired data may be uploaded to private and/or shared databases, social networks, and/or any other location accessible over a wired or wireless connection.

Figure 2:
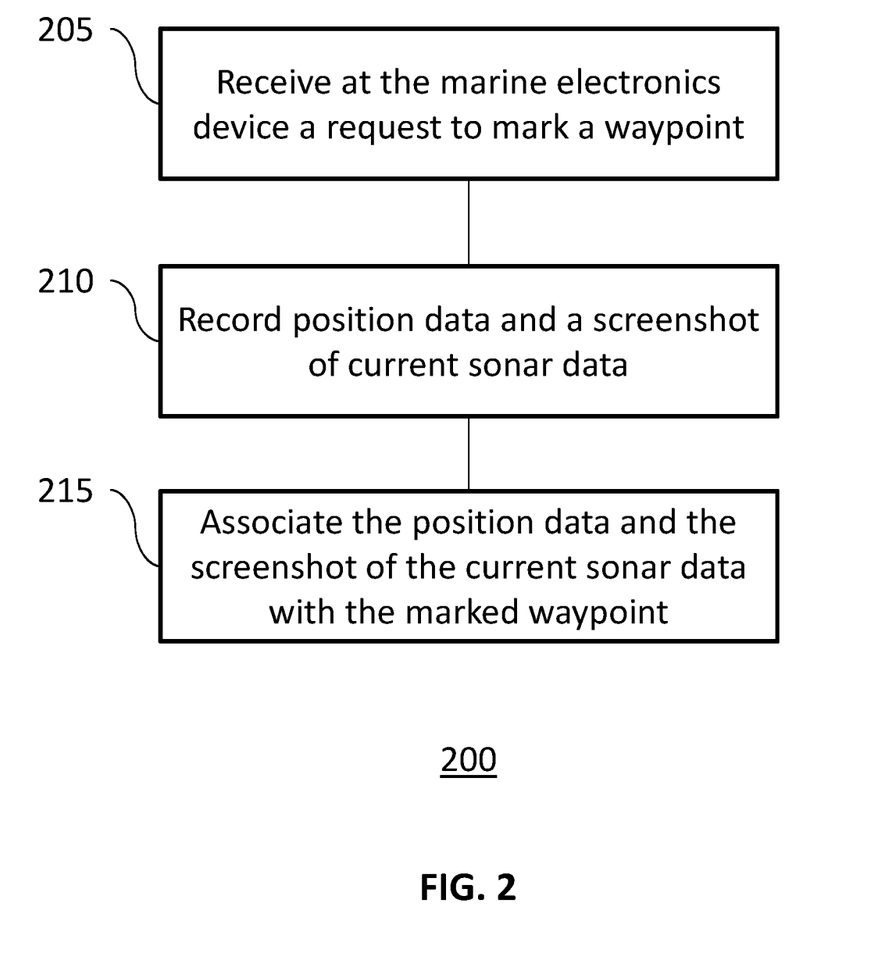
FIG. 2 illustrates a method for capturing data using a marine electronics device in accordance with implementations of various techniques described herein.

FIG. 2 illustrates a method 200 for capturing data using a marine electronics device in accordance with various implementations described herein. In one implementation, method 200 may be performed by a computing system. It should be understood that while method 200 indicates a particular order of execution of operations, in some implementations, certain portions of the operations might be executed in a different order. Further, in some implementations, additional operations or steps may be added to method 200. Likewise, some operations or steps may be omitted.

Present day devices allow the setting of a waypoint on a chart panel of a marine electronics device. Setting a waypoint allows a user to mark a spot on a map so that the user may return to that spot later. These waypoints are usually just assigned a number. Some users name their waypoints, however, most users tend to leave these waypoints in a numbered list. Usually users set so many waypoints that they can't remember what they were marking. Various techniques described herein provide a way to add more data to the waypoints to help users remember the reason for creating those waypoints. In one implementation, sonar data may be captured at the time when a waypoint is made. When a user marks a waypoint, a marine electronics device takes a screenshot of the sonar data and saves that sonar data as part of the waypoint.

Some conventional techniques do the exact opposite of what is described herein. Those conventional techniques allow users to take a screenshot. When the user takes the screenshot, the system sets a waypoint. This may be a disadvantage to the user because many times, the users end up setting waypoints that they don't want.

At block 205, the marine electronics device receives a request to mark a waypoint. At block 210, the marine electronics device records position data and a screenshot of current sonar data.

When a user, e.g., an angler, sees a point of interest, e.g., a good fishing hole, wreckage, or some other location to mark, the user may press a button and mark a waypoint. The user may look back at a later time to take note of those points of interest. The next time the user returns to that particular body of water, the waypoints can be used to guide the user back to previously marked locations. To help the angler remember better, the marine electronics device takes a snapshot or screenshot of the sonar data generated at the time the waypoint is created. That way the marked waypoint now has the ability to show the point in time, the location (latitude, longitude), underneath the boat (bunch of fish), and/or a wreckage or some other structure and ties this data to the waypoint.

At block 215, the marine electronics device associates the position data and the screenshot of the current sonar data with the marked waypoint.

In one implementation, when a waypoint is marked, an indicator is created for the waypoint on the chart panel of the marine electronics device. This indicator is associated with the screenshot taken at the time the waypoint was created. In one implementation, this indicator may be a thumbnail of the screenshot. When the thumbnail is selected by the user, a larger or full-sized representation of the screenshot is presented on the screen of the marine electronics device.

In one implementation, when the marine electronics device shows a screen that provides chart information, the user may select the waypoint. Selecting the waypoint would provide a small box having a thumbnail of the screenshot associated with the waypoint. When a user selects the screenshot, a larger or full-sized representation of the screen shot would be presented on the screen of the marine electronics device.

In one implementation, the waypoint information appears in a waypoint list. When the user is viewing the waypoint list on the marine electronics device, the user may select a particular waypoint. A selection of the waypoint brings the user to a waypoint data panel where configurations and other data may be set for the waypoint. The waypoint data panel includes all of the information that is stored for the waypoint. For example, in the waypoint data panel, information such as the name, an icon, or other information can be configured. In addition, an indicator may also be shown when a screen shot has been created for the waypoint. As detailed above, this indicator may be a thumbnail that, when selected by the user, is shown as a larger or full-sized representation of the screenshot on a screen of the marine electronics device.

Figure 3:
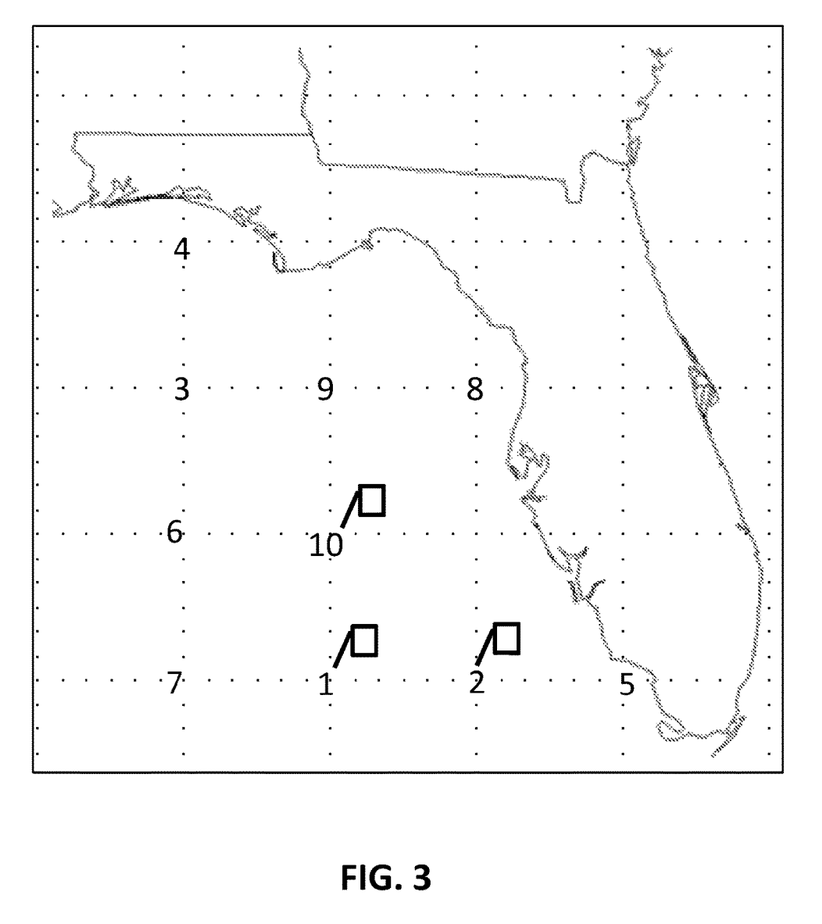
FIG. 3 illustrates an example screen showing waypoint data on a chart in accordance with implementations of various techniques described herein.

FIG. 3 illustrates an example screen showing waypoint data on a chart in accordance with implementations of various techniques described herein. The example screen of FIG. 3 includes ten waypoints (1-10). In this example waypoints 1, 2, and 10 include the indication, e.g., thumbnail, as described above.

Figure 4:
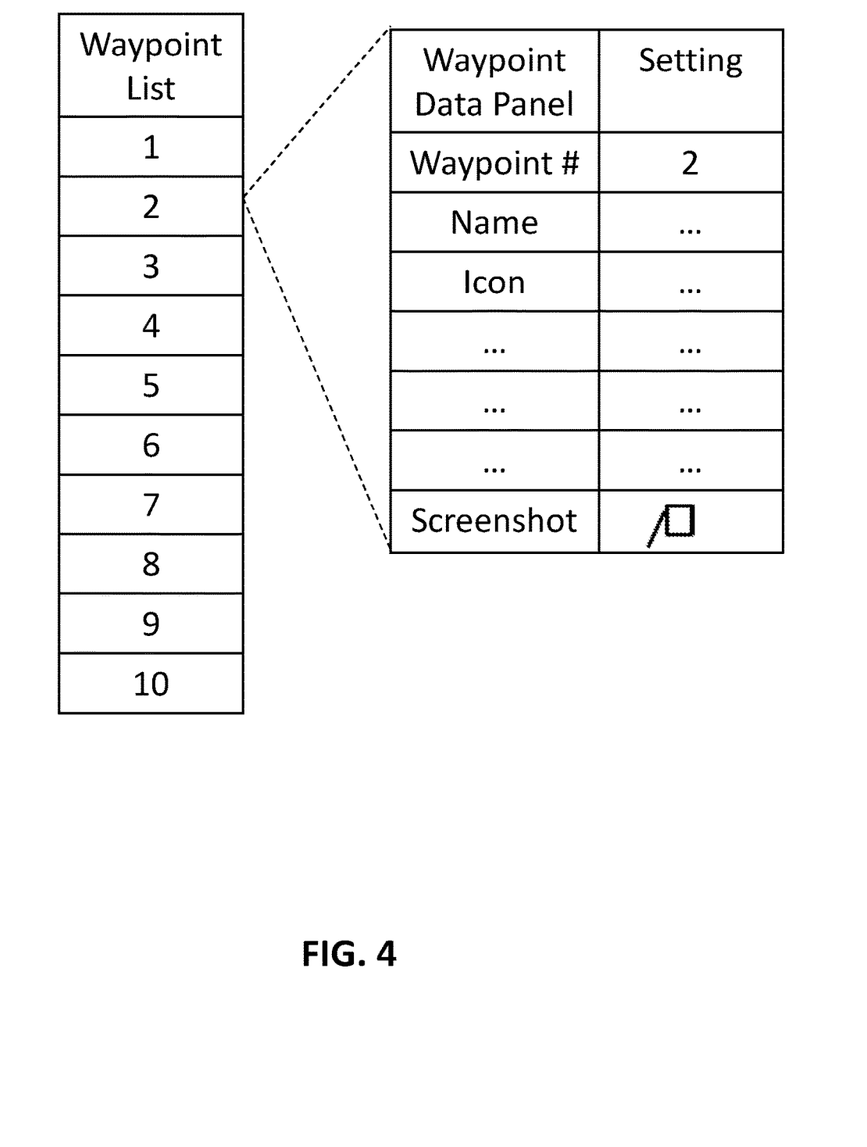
FIG. 4 illustrates an example waypoint list and waypoint data panel in accordance with implementations of various techniques described herein.

FIG. 4 illustrates an example waypoint list and waypoint data panel in accordance with implementations of various techniques described herein. In this example, a waypoint list includes the ten saved waypoints denoted in the chart of FIG. 3. In addition, the waypoint data panel showing configuration and/or saved data related to a particular waypoint is shown. In this example, the data panel shows data related to Waypoint #2.

Figure 5:
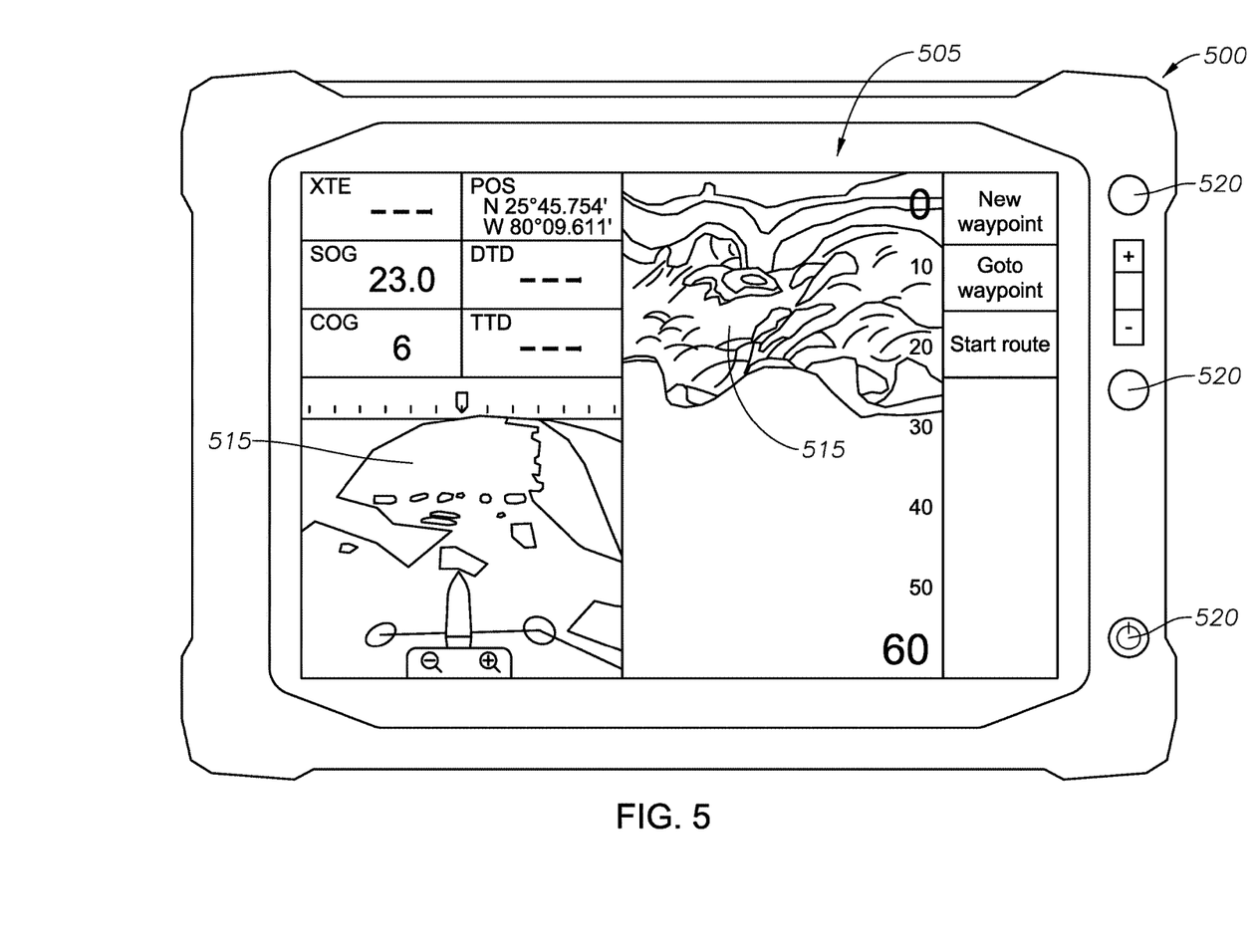
FIG. 5 illustrates an example schematic of a marine electronics device in accordance with implementations of various techniques described herein.

FIG. 5 illustrates an example schematic of a marine electronics device 500 in accordance with implementations of various techniques described herein. The marine electronics device 500 includes a screen 505. In certain implementations, the screen 505 may be sensitive to touching by a finger. In other implementations, the screen 505 may be sensitive to the body heat from the finger, a stylus, or responsive to a mouse. The marine electronics device 500 may be attached to a National Marine Electronics Association (NMEA) bus or network. The marine electronics device 500 may send or receive data to or from another device attached to the NMEA 2000 bus. For example, the marine electronics device 500 may transmit commands and receive data from a motor or a sensor using an NMEA 2000 bus. In one implementation, the marine electronics device 500 may be capable of steering a vessel and controlling the speed of the vessel, i.e., autopilot. For example, one or more waypoints may be input to the marine electronics device 500, and the marine electronics device 500 may steer a vessel to the one or more waypoints. The marine electronics device 500 may transmit or receive NMEA 2000 compliant messages, messages in a proprietary format that do not interfere with NMEA 2000 compliant messages or devices, or messages in any other format. In various implementations, the marine electronics device 500 may be attached to various other communication buses and/or networks configured to use various other types of protocols that may be accessed via, e.g., NMEA 2000, NMEA 0183, Ethernet, Proprietary wired protocol, etc. In some implementations, the marine electronics device 500 may communicate with other devices on the vessel via wireless communication protocols.

In one implementation, the marine electronics device 500 be used to implement the features and/or methods of FIGS. 1-4.

The marine electronics device 500 may be operational with numerous general purpose or special purpose computing system environments or configurations. The marine electronics device 500 may include any type of electrical and/or electronics device capable of processing data and information via a computing system. The marine electronics device 500 may include a marine instrument, such that the marine electronics device 500 may use the computing system to display and/or process the one or more types of marine electronics data. The marine electronics device 500 may be configured to display marine electronic data 515, such as, e.g., chart data, radar data, sonar data, steering data, dashboard data, navigation data, fishing data, engine data, lighting operation data, and the like. Further, the marine electronics device 500 may also include one or more buttons 520 that may include either physical buttons or virtual buttons, or a combination thereof. Still further, the marine electronics device 500 may receive input through a screen 505 sensitive to touch or buttons 520.

The computing system may include a central processing unit (CPU), a system memory, a graphics processing unit (GPU), and a system bus that couples various system components including the system memory to the CPU. The computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 500). The monitor (MFD 500) includes a screen 505. In certain implementations, the screen 505 may be sensitive to touching by a finger. In other implementations, the screen 505 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for example, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 500 is disposed. The GPS receiver system may then transmit the position data to the marine electronics device 500. In other examples, any positioning system known to those skilled in the art may be used to determine and/or provide the position data for the marine electronics device 500.

The marine electronics system may include one or more components disposed at various locations on the vessel. Such components may include one or more data modules, sensors, instrumentation, and/or any other devices known to those skilled in the art that may transmit various types of data to the marine electronics device 500 for processing and/or display. The various types of data transmitted to the marine electronics device 500 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar data, an AIS transponder for recording the AIS data, a paddlewheel sensor for recording the speed data, and/or the like.

The marine electronics device 500 may receive external data via the LAN or the WAN. In one implementation, the external data may relate to information not available from the marine electronics system. The external data may be retrieved from the Internet or any other source. The external data may include atmospheric temperature, tidal data, weather, moon phase, sunrise, sunset, water levels, historic fishing data, and other fishing data.

In one implementation, the marine electronics device 500 may be a multi-function display (MFD) unit, such that the marine electronics device 500 may be capable of displaying and/or processing multiple types of marine electronics data. FIG. 5 illustrates a schematic diagram of an MFD unit in accordance with implementations of various techniques described herein. In particular, the MFD unit may include the computing system, the monitor (MFD 500), the screen 505, and the buttons such that they may be integrated into a single console.

Figure 6:
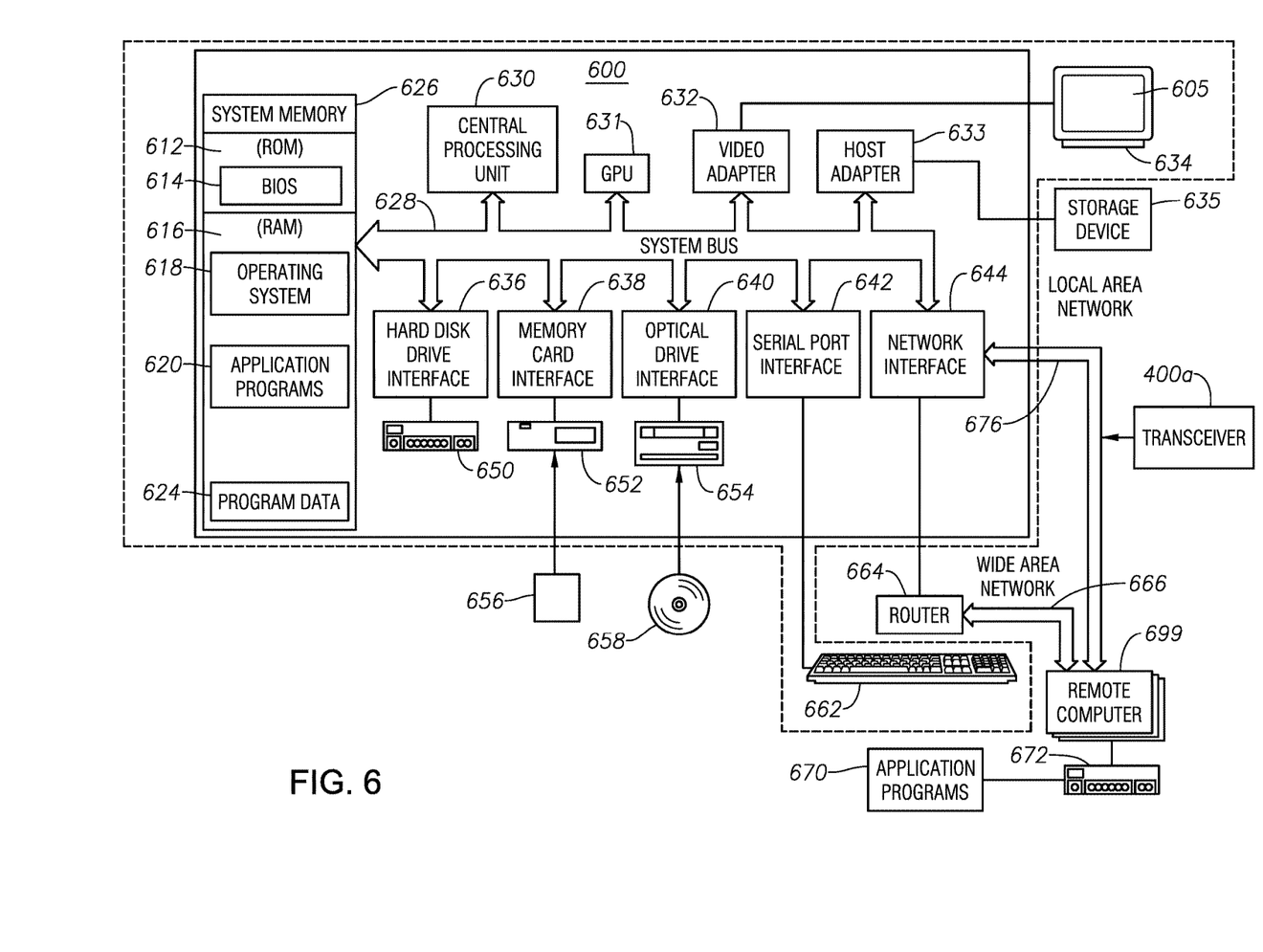
FIG. 6 illustrates a computing system in accordance with implementations of various techniques described herein.

FIG. 6 illustrates a computing system 600 in accordance with implementations of various techniques described herein. The computing system 600 may include a central processing unit (CPU) 630, a system memory 626, a graphics processing unit (GPU) 631 and a system bus 628 that couples various system components including the system memory 626 to the CPU 630. Although only one CPU 630 is illustrated in FIG. 6, it should be understood that in some implementations the computing system 600 may include more than one CPU 630.

The CPU 630 may include a microprocessor, a microcontroller, a processor, a programmable integrated circuit, or a combination thereof. The CPU 630 can comprise an off-the-shelf processor such as a Reduced Instruction Set Computer (RISC), or a Microprocessor without Interlocked Pipeline Stages (MIPS) processor, or a combination thereof. The CPU 630 may also include a proprietary processor.

The GPU 631 may be a microprocessor specifically designed to manipulate and implement computer graphics. The CPU 630 may offload work to the GPU 631. The GPU 631 may have its own graphics memory, and/or may have access to a portion of the system memory 626. As with the CPU 630, the GPU 631 may include one or more processing units, and each processing unit may include one or more cores.

The CPU 630 may provide output data to a GPU 631. The GPU 631 may generate graphical user interfaces that present the output data. The GPU 631 may also provide objects, such as menus, in the graphical user interface. A user may provide inputs by interacting with the objects. The GPU 631 may receive the inputs from interaction with the objects and provide the inputs to the CPU 630. A video adapter 632 may be provided to convert graphical data into signals for a monitor 634. The monitor 634 includes a screen 605. In certain implementations, the screen 605 may be sensitive to touching by a finger. In other implementations, the screen 605 may be sensitive to the body heat from the finger, a stylus, or responsive to a mouse. Additionally, in certain implementations, the screen may have the capability of displaying more than one plan position indicator (PPI).

The system bus 628 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 626 may include a read only memory (ROM) 612 and a random access memory (RAM) 616. A basic input/output system (BIOS) 614, containing the basic routines that help transfer information between elements within the computing system 600, such as during start-up, may be stored in the ROM 612.

The computing system 600 may further include a hard disk drive interface 636 for reading from and writing to a hard disk 650, a memory card reader 652 for reading from and writing to a removable memory card 656, and an optical disk drive 654 for reading from and writing to a removable optical disk 658, such as a CD ROM or other optical media. The hard disk 650, the memory card reader 652, and the optical disk drive 654 may be connected to the system bus 628 by a hard disk drive interface 636, a memory card reader interface 638, and an optical drive interface 640, respectively. The drives and their associated computer-readable media may provide nonvolatile storage of computer-readable instructions, data structures, program modules and other data for the computing system 600.

Although the computing system 600 is described herein as having a hard disk, a removable memory card 656 and a removable optical disk 658, it should be appreciated by those skilled in the art that the computing system 600 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 600 may also include a host adapter 633 that connects to a storage device 635 via a small computer system interface (SCSI) bus, a Fiber Channel bus, an eSATA bus, or using any other applicable computer bus interface.

The computing system 600 can also be connected to a router 664 to establish a wide area network (WAN) 666 with one or more remote computers 674. The router 664 may be connected to the system bus 628 via a network interface 644. The remote computers 674 can also include hard disks 672 that store application programs 670.

In another implementation, the computing system 600 may also connect to the remote computers 674 via local area network (LAN) 676 or the WAN 666. When using a LAN networking environment, the computing system 600 may be connected to the LAN 676 through the network interface or adapter 644. The LAN 676 may be implemented via a wired connection or a wireless connection. The LAN 676 may be implemented using Wi-Fi™ technology, cellular technology, Bluetooth™ technology, satellite technology, or any other implementation known to those skilled in the art. The network interface 644 may also utilize remote access technologies (e.g., Remote Access Service (RAS), Virtual Private Networking (VPN), Secure Socket Layer (SSL), Layer 6 Tunneling (L2T), or any other suitable protocol). These remote access technologies may be implemented in connection with the remote computers 674. It will be appreciated that the network connections shown are exemplary and other means of establishing a communications link between the computer systems may be used.

A number of program modules may be stored on the hard disk 650, memory card 656, optical disk 658, ROM 612 or RAM 616, including an operating system 618, one or more application programs 620, and program data 624. In certain implementations, the hard disk 650 may store a database system. The database system could include, for example, recorded points. The application programs 620 may include various mobile applications ("apps") and other applications configured to perform various methods and techniques described herein. The operating system 618 may be any suitable operating system that may control the operation of a networked personal or server computer.

A user may enter commands and information into the computing system 600 through input devices such as buttons 662, which may be physical buttons, virtual buttons, or combinations thereof. Other input devices may include a microphone, a mouse, or the like (not shown). These and other input devices may be connected to the CPU 630 through a serial port interface 642 coupled to system bus 628, but may be connected by other interfaces, such as a parallel port, game port or a universal serial bus (USB).

Certain implementations may be configured to be connected to the transceiver section 400a of the computing system 600. In one implementation, the one or more application programs 620 or 670 stored in the computer-readable media can include a plurality of instructions that when executed by a processing unit, such as a CPU 630, cause the computing system to perform any of the techniques, or portions thereof, that are described herein.

The description provided above has been purposely limited to the context of an enhanced mark button function of a marine electronics device. It should be readily apparent, however, that the techniques described above are also applicable to applications outside of a marine environment. For example, the techniques described above may also be effective in relation to other sonar and radar based applications, commercial and recreational aviation applications, automotive applications, and sub-marine applications.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference has been made in detail to various implementations, examples of which are illustrated in the accompanying drawings and figures. In the above detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for capturing marine electronics data, the apparatus comprising:
    a user interface comprising a mark button;
    a processor;
    memory having a plurality of executable instructions which, when executed by the processor, cause the processor to:
        receive a first request to capture data, wherein the first request comprises user input indicative of user interaction with the mark button;
        generate a command in response to the first request;
        send the command across a network to a plurality of marine devices, the command comprising at least timestamp data or a unique identifier and a second request for each of the plurality of marine devices to collect current marine data at each of the plurality of marine devices;
        receive the current marine data from each of the plurality marine devices; and
        associate and store the current marine data from each of the plurality of marine devices in the memory based on the timestamp data or unique identifier, such that the associated current marine data provides a snapshot of the marine environment.

2. The apparatus of claim 1, wherein the first request is initiated upon actuation of the mark button.

3. The apparatus of claim 1, wherein actuation of the mark button provides a drop down menu and selection of an item in the drop down menu initiates the first request.

4. The apparatus of claim 1, wherein a plurality of snapshots of current marine data are collected periodically during a background operation.

5. The apparatus of claim 1, wherein the associated current marine data comprises a static snapshot of the marine environment.

6. The apparatus of claim 1, wherein the associated current marine data comprises a series of snapshots of the marine environment.

7. The apparatus of claim 6, wherein the series of snapshots are recorded for a trail of locations.

8. The apparatus of claim 6, wherein the series of snapshots are recorded over time, wherein the series of snapshots are recorded at a predetermined time interval.

9. The apparatus of claim 6, wherein the series of snapshots is stopped when a threshold has been reached.

10. The apparatus of claim 9, wherein the threshold comprises an event-based threshold.

11. The apparatus of claim 9, wherein the threshold comprises a time-based threshold.

12. The apparatus of claim 1, wherein the plurality of marine devices comprise at least two of a chart device, a radar device, a sonar device, a motor, a marine sensor, and a position sensor.

13. The apparatus of claim 1, wherein the current marine data comprises at least two of location, temperature, depth, weather conditions, location of catch, location of anchor, tank level flow level, boat status, imaging status, wind speed, radar data, sonar data, speed data, heading data, automatic identification system (AIS) data, Doppler data, navigation data, and course data.

14. A non-transitory computer-readable medium having stored thereon a plurality of computer-executable instructions which, when executed by a computer, cause the computer to:
    receive, at a marine electronics device, a first request to capture data, wherein the first request comprises user input indicative of user interaction with a mark button disposed on a user interface;
    generate, by the marine electronics device, a command in response to receiving the first request;
    send, by the marine electronics device, a command across a network to a plurality of marine devices, the command comprising at least a timestamp or a unique identifier and a second request for each of the plurality of marine devices to collect current marine data at each of the plurality of marine devices;
    receive, by the marine electronics device, the current marine data from each of the plurality marine devices; and
    associate and store, by the marine electronics device, the current marine data from each of the plurality of marine devices in a memory based on the timestamp data or unique identifier, such that the associated current marine data provides a snapshot of the marine environment.

15. The apparatus of claim 14, wherein the first request is initiated upon actuation of the mark button.

16. The apparatus of claim 14, wherein actuation of the mark button provides a drop down menu and selection of an item in the drop down menu initiates the first request.

17. The apparatus of claim 14, wherein a plurality of snapshots of current marine data are collected periodically during a background operation.

18. The apparatus of claim 14, wherein the associated current marine data comprises a static snapshot of the marine environment.

19. The apparatus of claim 14, wherein the associated current marine data comprises a series of snapshots of the marine environment.

20. The apparatus of claim 19, wherein the series of snapshots are recorded for a trail of locations or are recorded over time, wherein the series of snapshots are recorded at a predetermined time interval.

* * * * *